United States Patent [19]
Pedretti et al.

[11] Patent Number: 5,086,160
[45] Date of Patent: Feb. 4, 1992

[54] THERMOTROPIC COPOLYESTER, PROCESS FOR PREPARING IT AND ITS USE

[75] Inventors: Ugo Pedretti, Milan; Bruno Bresci, Livorno; Cesarina Bonfanti, Milan; Pier L. Magagnini, Riglione; Francesco P. La Mantia, Palermo; Arnaldo Roggero, San Donato Milanese, all of Italy

[73] Assignee: Eniricerche S.p.A., Milan, Italy

[21] Appl. No.: 531,756

[22] Filed: Jun. 1, 1990

Related U.S. Application Data

[62] Division of Ser. No. 358,145, May 30, 1989, Pat. No. 4,970,285.

[30] Foreign Application Priority Data

Jun. 23, 1988 [IT] Italy .................. 21079 A/88

[51] Int. Cl.⁵ .............. C08G 63/00; C08G 63/02; C08G 63/18; C08G 67/00
[52] U.S. Cl. .................. 528/291; 525/437; 528/176; 528/193; 528/480; 528/481; 528/483
[58] Field of Search ........... 525/437; 528/176, 193, 528/480, 481, 483, 271

[56] References Cited

U.S. PATENT DOCUMENTS 4,390,681  6/1983  Deex ..................... 528/193

Primary Examiner—Harold D. Anderson
Assistant Examiner—T. Mosley
Attorney, Agent, or Firm—Oblon, Spivak, McClelland, Maier & Neustadt

[57] ABSTRACT

A thermotropic copolyester, showing a liquid-crystalline structure of nematic type within a desired temperature range, contains umits deriving from:
(a) a saturated bicarboxy aliphatic acid;
(b) 4,4'-di-hydroxy-diphenyl,
(c) 4-hydroxybenzoic acid; and
(d) 4-hydroxy-benzoic acid bearing an alkyl substituent or a halogen atom bonded to the aromatic ring.

Such a copolyester constitutes a material endowed with self-reinforcing characteristics, originating, through the usual transformation processes by injection or by extrusion techniques, marked molecular orientations, which supply the manufactured articles with high stiffness characteristics.

Said material can be also used as a reinforcing agent when is mixed, by means of the usual techniques, with the traditional thermoplastic polymers.

4 Claims, No Drawings

THERMOTROPIC COPOLYESTER, PROCESS FOR PREPARING IT AND ITS USE

This is a division of application Ser. No. 07/358,145, filed on May 30, 1989, now U.S. Pat. No. 4,970,285.

The present invention relates to a liquid-crystalline, thermotropic copolyester, and to the processes for preparing it.

The invention relates also to the use of such a copolyester as a self-reinforcing material, or as a reinforcing agent for the traditional thermoplastic polymers.

In the art particular macromolecular compounds are known, which display a thermotropic behaviour by turning, at temperatures lower than the temperatures at which their thermal breakdown occurs, into liquids characterized by a high degree of structural order. Due to this characteristic, such polymers originate, by means of processes of extrusion or of injection, manufactured articles endowed with high mechanical properties. They are furthermore useful for preparing fibers having a high orientation degree, or objects with a very complex geometry, by virtue of the relatively low viscosity of their molten phases. Most polymeric compounds of this type show the chemical structure of completely aromatic polyesters.

In the art, also liquid-crystalline polyesters are known, which contain in their macromolecule rigid (aromatic) units alternating with flexible (aliphatic) units, e.g., those as described by Krigbaum and coworkers in J. Polym. Sci., Polym. Phys. Ed., 21, 1119 (1983) and in Macromolecules, 16, 1271 (1983).

In the U.S. patent application Ser. No. 167,106 of Mar. 11, 1988, a liquid-crystalline copolyester is disclosed, which contains units deriving from hydroxybenzoic acid, a saturated aliphatic dicarboxy acid and 4,4'-di-hydroxy-biphenyl. Such a copolyester, which shows a mesophase of nematic type within a wide range of temperatures, comprising those temperatures at which many traditional thermoplastic polymers are processed, such as nylon, polyethylene terephthalate, polybutylene terephthalate, polycarbonate, and so forth, is suitable for being used as a self-reinforced material, or as a reinforcing agent for the above cited traditional polymers.

In the same patent application the effect is disclosed which is exerted by the content of units deriving from 4-hydroxy-benzoic acid on the properties of the copolyester. In particular for contents of such units lower than a certain limit value, the properties result to be poorer, probably due to the segregation of a crystalline phase generated by long blocks of such units.

The purpose of the present invention is of overcoming, or substantially overcoming, such a drawback, by means of the addition of units deriving from p-hydroxybenzoic acid bearing a substituent on its ring in the copolyester of the above cited U.S. patent application. Such a substituent can be a halogen atom or a lower alkyl group.

The present Applicant has found that the presence of these units introduces in the macromolecule structural irregularities randomly distributed along the chain, which limit the trend to the segregation of high-melting crystalline phases, and therefore make it possible the range of compositions capable of yielding liquid-crystalline copolyesters endowed with attracting thermal and mechanical properties, to be considerably extended.

In accordance therewith, the present invention relates to a thermotropic copolyester originating, within a desired range of temperatures, a mesophase of nematic type, which contains in its macromolecules units deriving from:

(a) a saturated α,ω-dicarboxy aliphatic acid:

wherein:
n is a number comprised within the range of from 3 to 8;

(b) 4,4'-di-hydroxy-biphenyl:

(c) 4-hydroxy-benzoic acid:

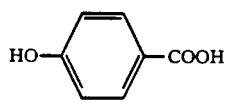

and (d) substituted 4-hydroxy-benzoic acid:

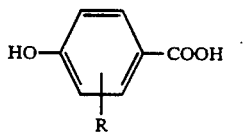

wherein:
R is a halogen atom, or a linear or branched alkyl radical containing from 1 to 4 carbon atoms with the following mutual ratios of its constituting units to one another:

$(a)/(b) = 1$;

$[(c)+(d)]/(a) = 1-7$;

$(d)/[(c)+(d)] = 0.1-1$.

The copolyester according to the present invention preferably shows the following values of said ratios of its constituting units to one another:

$(a)/(b) = 1$;

$[(c)+(d)]/(a) = 2-6$;

$(d)/[(c)+(d)] = 0.2-0.7$.

Among the saturated aliphatic α,ω-dicarboxy acids, sebacic acid, suberic acid and adipic acid are the most commonly used ones. From them, most preferred is sebacic acid.

The R substituent in the (d) component can be chlorine, fluorine, bromine or the methyl, ethyl, n-propyl, isopropyl, n-butyl, isobutyl or tert.-butyl groups. Among these, chlorine, methyl and n-propyl are the preferred substituents.

The copolyester according to the present invention can be obtained by means of reactions of esterification and transesterification, carried out in the molten state at increasing temperatures of from about 190° C. up to a maximum value of about 320° C., and under decreasing pressures, e.g., down to an end value of about $10^{-4}$ mm$_{Hg}$.

The reaction of copolymerization can be indifferently carried out both by starting from the acylated derivatives of the (b), (c) and (d) hydroxylated reactants, and by starting from said compounds in their hydroxy form, with the addition of an excess of an acyl anhydride.

The reaction can be catalyzed by various derivatives of alkali metals or of alkali-earth metals, such as the carboxylates of sodium, potassium, calcium, magnesium and zinc, the oxides of said metals, or the oxides of such other metals as titanium, antimony and tin. For the intended purpose, sodium acetate is preferably used in an amount comprised within the range of from 0.01 to 1 parts by weight per each 100 parts by weight of the monomers submitted to the copolymerization.

In the above mentioned copolymerization process, the acyl derivatives of the (b), (c) and (d) reactants are first prepared by means of the reaction with the selected acyl anhydride. The preferred 4,4'-diacyloxy-biphenyl is 4,4'-diacetoxy-biphenyl, which can be obtained by means of the reaction of 4,4'-di-hydroxy-biphenyl with acetic anhydride.

The preferred (either substituted or non-substituted) 4-acyl-oxy-benzoic acid is (either substituted or non-substituted) 4-acetoxy-benzoic acid, which can be obtained by means of the reaction of (either substituted or non-substituted) 4-hydroxy-benzoic acid with acetic anhydride. Some substituted 4-hydroxy-benzoic acids are available from the market. Other acids belonging to this class, such as methyl-substituted or n-propyl-substituted 4-hydroxy-benzoic acid, can be prepared by means of the normal techniques of organic chemistry.

The copolymerization is carried out by mixing in a reactor the desired proportions of $\alpha,\omega$-bicarboxy-acid, 4,4'-diacetoxy-biphenyl, 4-acetoxy-benzoic acid and substituted 4-acetoxy-benzoic acid. The catalyst is added, and the mixture is heated under a dry nitrogen atmosphere until its melting occurs.

The progressive temperature increase causes acetic acid to be developed, which is released owing to the condensation reaction. During the end steps of the reaction, owing to the increase in viscosity of the reaction mixture, the development of acetic acid can be speeded up by means of a progressive reduction in reactor pressure. By operating in this way, a progressive increase is obtained in the molecular weight of the produced copolyester, which takes place with the elimination, besides acetic acid, of small amounts of further low-molecular-weight byproducts.

The copolymerization is stopped by discontinuing the heating when the material reaches the desired viscosity. Usually, the highest temperature values reached during the copolymerization is of the order of 280° C. and the required copolymerization times can be comprised within the range of from 3 to 10 hours and preferably are of the order of from 5 to 7 hours.

In the second copolymerization process as hereinabove indicated, the desired proportions of $\alpha,\omega$-bicarboxy acid, 4,4'-di-hydroxy-biphenyl, 4-hydroxy-benzoic acid and substituted 4-hydroxy-benzoic acid are charged to the reactor. To said mixture the catalyst is added, together with an amount of acetic anhydride which is in a slight excess relatively to the stoichiometry of the reaction of acetylation of all of four hydroxy groups contained in the reactants. The reaction mixture is then gradually heated until the complete dissolution is obtained, and the process is continued by copolymerizing under the above disclosed conditions.

The so-obtained copolyester is purified, after being cooled down to room temperature and is ground, by means of a prolonged extraction with organic solvents at boiling temperature, or by precipitation from solutions in organic solvents.

The copolyesters according to the present invention show crystal phase/mesophase transition temperatures comprised within the range of from about 140° C. up to about 320° C.

The intrinsic viscosity of the copolyesters produced by means of the processes according to the present invention is comprised within the range of from 0.6 to 3.5, when measured at 60° C., in solution in pentafluorophenol, at the concentration of 0.1 g/dl.

The spectrophotometric analysis demonstrates that the composition of the copolyester is substantially the same composition as expected on the basis of the proportions of the monomers used for the preparation of the same copolyester.

The characterization of the structure of the copolyesters produced was carried out by means of X-ray diffractometry on powder samples, using the Cu K$\alpha$ radiation, by means of a D.500 Model Siemens Diffractometer equipped with an adjustable-temperature cell. The structure of such copolyesters, determined at room temperature, varies with varying composition and, in particular, with varying values of mutual unit (a):(b):(c+d)

ratio.

In case of small values of (c+d) unit contents, and consequently, on the basis of the hereinabove specified preferred compositions, of low contents of (d) units, the prevailing structure, at low temperatures, is of pseudo-hexagonal type. In case of large contents of (c+d) units, and, consequently, on the basis of the preferred compositions as hereinabove specified, of large contents of (d) units, the presence can be possibly observed of high-melting crystalline phases formed by the ordered arrangement of long chain portions formed by these units. Finally, in case of intermediate contents of (c+d) units, the spectra of the powders result to be very similar to those typical for the nematic polymeric mesophases.

The thermal characterization of the copolyesters, carried out by means of the techniques of differential colorimetry and of thermo-optical analysis, demonstrates the presence of a transition of the first order, corresponding to the passage from the crystalline state to the nematic state, at temperature comprised within the range of from about 140° C. up to 320° C., according to the composition.

Also the enthalpy of transition shows strong changes with varying composition, and results to be particularly low for the copolyesters with intermediate contents of (c+d) units and showing a low crystallinity at X rays.

The above disclosed copolyesters show, at temperatures higher than the melting temperature of the crystalline state, a stable nematic mesophase up to temperatures higher than 320° C. The copolyesters with melting points close to the highest threshold value as above stated, of 320° C., i.e., those with higher contents of (c+d) units, show a limited processability, owing to the closeness of their thermal breakdown temperature.

The other copolyesters can be submitted to thermal treatments of annealing at temperatures slightly lower than the crystal phase-mesophase transition temperatures and under preferably reduced pressures.

The most commonly used conditions are temperatures comprised within the range of from 130° C. up to 200° C., and pressures comprised within the range of from 760 down to $10^{-3}$ mm$_{Hg}$, under an inert and anhydrous and treatment times comprised within the range of from 1 to 20 hours. Owing to the above detailed thermal treatment, a gradual increase of the temperature of crystal phase-nematic-mesophase transition is normally observed; with said transition temperature tending then, for longer treatment times, to reach a constant limit value. The minimum increase in temperature which was observed was of about 30° C.

Simultaneously with the increase in said temperature of crystal phase-mesophase transition, also an increase is usually observed in the molecular weight of the copolymers, as demonstrated by the increase in their intrinsic viscosity, as measured in pentafluorophenol at 60° C. and at a concentration of 0.1 g/dl.

The copolyesters according to the present invention, in particular those having the composition comprised within the preferred ranges, can be transformed by means of the usual techniques of processing of the polymeric materials, such as injection-moulding and extrusion. In the manufactured articles obtained, an anisotropy can be observed, which is due to the marked orientation of the macromolecules. In particular by means of the extrusion techniques, a preferential uniform orientation in flowing direction can be induced, which can be enhanced by inducing a flux of elongational type, such as, e.g., by means of a stretching step.

The mechanical characteristics of the extruded and stretched manufactured articles which can be obtained from the copolyesters according to the present invention are characterized by values of the extensional elastic modulus of 20–40 GPa and values of tenacity of 200–700 MPa. The values of elongation at break are generally comprised within the range of from 2 to 1%.

The copolyesters according to the present invention can be blended with the traditional thermoplastic polymers, with the normal blending techniques, at the temperatures of processing of these latter, in order to yield materials containing different percentages of the liquid-crystalline polymer.

On the basis of economic considerations, the preferred compositions are those containing up to 30% by weight of the copolyester according to the present invention. The so-obtained blends are constituted by two practically mutually incompatible phases. However, in the manufactured articles which can be obtained by processing the same blends, the phase constituted by the copolyester can result dispersed through the matrix as particles with a more or less marked fibrillar geometry, with the same particles being orientated in the flow direction. In this case, improvements may occur in the mechanical properties of the thermoplastic material which constitutes the continuous phase of the blends, which can be estimated of round 10–30% for the extensional elastic modulus, and of round 5–25% for the tenacity, in case of blends containing from 5 to 30% of copolyester.

The blends, also those containing low amounts (comprised within the range of from 2 to 5%) of polymeric liquid crystal, show also favourable rheologic characteristics. In particular the viscosity of the thermoplastic polymer results to be reduced, with the temperature being the same, by the addition of the copolyester and therefore the necessary processing energy results to be decreased.

The following experimental examples are reported in order to better explain the invention.

EXAMPLE 1

To a glass reactor of 2 liters of capacity, equipped with a stainless-steel stirring means with a tight seal of "Brignole" type, with a inlet for monomers charging and with a tube for nitrogen feed and for vacuum application by means of the connection with a high-vacuum line connected with a mechanical vacuum pump and a diffusion vacuum pump, the following reactants are charged:

| | | |
|---|---|---|
| sebacic acid | 40.4 g | (0.2 mol) |
| 4,4'-di-acetoxy-biphenyl | 54.0 g | (0.2 mol) |
| 4-acetoxy-benzoic acid | 108.0 g | (0.6 mol) |
| 4-acetoxy-3-chlorobenzoic acid | 85.6 g | (0.4 mol) |
| sodium acetate, anhydrous | 57.4 mg | (0.7 mmol) |

After evacuating the reactor, dry nitrogen is fed and this procedure is repeated a plurality of times.

The reactor is subsequently heated with an oil bath until the melting of the monomers is obtained, with the nitrogen pressure inside the reactor being maintained equal to the atmospheric pressure, or to a slightly lower than atmospheric pressure.

The oil bath is replaced by a molten-salts bath and the temperature is increased up to 200°–210° C.; the temperature is then maintained constant at this value for approximately 1 hour. The evolution of vapours from the liquid phase is observed; said vapours condense in the overhead portion of the reactor, not dipped in the heating bath, and reflux. These conditions should be suitably maintained for a certain time in order to prevent the still unreacted monomers from partially separating from the mixture and forming a solid sublimate at the reactor's top portion, thus altering the composition of the product, relatively to the desired composition.

The temperature is then gradually increased up to about 250° C., with the nitrogen pressure being always maintained at a value of about 1 atm.

Under these conditions, acetic acid vapours can be condensed inside a flask connected with the tube of connection of the reactor with the vacuum line, and cooled by means of liquid nitrogen.

As the polymerization proceeds, the viscosity of the liquid mixture shows a small increase and turns opalescent.

At this time, the pressure is gradually decreased until the end conditions of high vacuum (about $10^{-4}$ mm$_{HS}$) are reached, with the temperature being simultaneously increased up to 290° C. The end temperature and vacuum conditions are maintained for approximately 1 hour. The reaction mass is then permitted to cool, under vacuum, down to room temperature. The copolyester is ground after being cooled with liquid nitrogen, and is extracted first with ethyl alcohol and then with boiling chloroform; the copolyester is then dried several hours under vacuum at 100° C.

The copolyester has an intrinsic viscosity of 1.4 dl/g, as measured in pentafluorophenol at 60° C., at the concentration of 0.1 g/dl.

EXAMPLE 2

By means of the same procedure as already disclosed in Example 1, the following reactants are charged to the reactor:

| | | |
|---|---|---|
| sebacic acid | 60.6 g | (0.3 mol) |
| 4,4'-di-hydroxy-biphenyl | 55.8 g | (0.3 mol) |
| 4-hydroxy-benzoic acid | 103.5 g | (0.75 mol) |
| 4-hydroxy-3-chlorobenzoic acid | 15.5 g | (0.09 mol) |
| acetic anhydride | 169.0 g | (1.66 mol) |
| sodium acetate | 41.0 mg | (0.5 mmol) |

The copolyester obtained, ground and extracted as disclosed in Example 1, shows an intrinsic viscosity of 1.6 dl/g, measured as hereinabove disclosed. The calorimetric analysis shows an endothermic transition at about 210° C., with an enthalpy of 5.2 J/g.

The copolyester powder is charged again to the reactor and is stirred under high vacuum at a temperature of 190° C. With increasing treatment time, an increase in temperature of crystal phase-mesophase transition up to 240° C. after 20 hours is observed. In the mean time, the transition becomes sharper and the therewith associated enthalpy increases up to 9 J/g.

The intrinsic viscosity of the annealed material increases up to a value of about 2.9 dl/g after the above treatment.

EXAMPLE 3

The following materials are charged to the reactor and are allowed to react according to the same procedure as of Example 1:

| | | |
|---|---|---|
| sebacic acid | 50.5 g | (0.25 mol) |
| 4,4'-di-acetoxy-biphenyl | 67.5 g | (0.25 mol) |
| 4-acetoxy-benzoic acid | 135.0 g | (0.75 mol) |
| 4-acetoxy-3-methylbenzoic acid | 97.0 g | (0.5 mol) |
| sodium acetate, anhydrous | 82.0 mg | (1.0 mmol) |

The reaction is carried out for a total time of 5 hours, with an end temperature of 270° C., maintained for a time of 1 hour, under high vacuum conditions ($10^{-3}$–$10^{-4}$ $MM_{Hg}$).

The obtained copolyester has an intrinsic viscosity of 1.8 dl/g and shows a weak crystal phase-mesophase transition at a temperature of about 210° C.

EXAMPLE 4

The following reactants are charged to the reactor:

| | | |
|---|---|---|
| sebacic acid | 40.4 g | (0.2 mol) |
| 4,4'-di-hydroxy-biphenyl | 37.2 g | (0.2 mol) |
| 4-hydroxy-benzoic acid | 44.2 g | (0.32 mol) |
| 4-hydroxy-3-methylbenzoic acid | 145.9 g | (0.96 mol) |
| acetic anhydride | 205.0 g | (2.01 mol) |
| sodium acetate, anhydrous | 32.8 mg | (0.4 mmol) |

The reaction is carried out according to the usual procedure but during the end step thereof, the temperature must be increased to more than 300° C., because the reaction mixture tends to solidify. In the present Example a temperature of 315° C. was reached, but these conditions could not be maintained for a time longer than 10 minutes, owing to the solidification of the product.

This latter, after cooling and grinding, was extracted with ethanol in order to eliminate the low-molecular-weight products. The obtained material has an intrinsic viscosity of 0.65 dl/g, measured in pentafluorophenol at 60° C. at a concentration of 0.1 g/dl.

The calorimetric analysis shows a crystal phase-mesophase transition at 320° C. The X-ray diffraction chart shows a crystallinity deriving from blocks of oxybenzoic units. The material shows a limited processability owing to the partial decomposition which can be observed at temperatures higher than 320° C.

EXAMPLE 5

The following reactants are charged to the reactor:

| | | |
|---|---|---|
| sebacic acid | 43.68 g | (0.216 mol) |
| 4,4'-di-acetoxy-biphenyl | 58.40 g | (0.216 mol) |
| 4-acetoxy-benzoic acid | 116.76 g | (0.648 mol) |
| 4-acetoxy-3-propylbenzoic acid | 48 g | (0.216 mol) |
| sodium acetate, anhydrous | 50 mg | (0.6 mmol) |

The same procedure of synthesis as disclosed in Example 1 is used; however, the temperature is maintained at the highest value of 240° C.

The obtained copolyester, ground and extracted as disclosed in Example 1, has an intrinsic viscosity of 1.8 dl/g, measured in pentafluorophenol at 60° C. at a concentration of 0.1 g/dl.

EXAMPLE 6

The copolyester obtained according to the procedure as disclosed in Example 3 is submitted to spinning in a Rheoscope 1000 viscometer by CEAST, equipped with the tensile module and with a conical extrusion nozzle with a half-angle of 30°, a diameter of 0,3 mm and length to diameter ratio (L/D ratio) of 20.

The process is carried out at the temperature of 240° C. and with a draft ratio of 100.

The obtained fibers display an extensional modulus of 35 GPa, a tensile strength of 500 MPa, and an elongation at break of 2%, as measured by means of an equipment of Instron 6025 Model, with an elongation rate of 0.5 $min^{-1}$.

EXAMPLE 7

The copolyester obtained by means of the procedure as disclosed in Example 5, is submitted to spinning by using the same equipment as detailed in Example 6.

The process is carried out at the temperature of 240° C. and with a draft ratio of 100.

The obtained fibers display an extensional modulus of 25 GPa, a tensile strength of 500 MPa, and an elongation at break of 2%, as measured by means of an equipment of Instron 6025 Model, with an elongation rate of 0.5 $min^{-1}$.

EXAMPLE 8

The copolyester obtained according to the same procedure as disclosed in Example 1 is blended in the molten state at 280° C., with a 10-minutes mixing on a Brabender mixer, with commercial polycarbonate, in the ratio of 20:80 by weight. The blend is ground in the presence of liquid nitrogen, is carefully dried for 24 hours at 130° C. and is compression moulded at 280° C. under a pressure of 10 MPa.

The obtained specimen, submitted to a tensile test on the hereinabove specified Instron equipment, shows an extensional modulus of about 2.0 GPa and a tensile strength of 52 MPa, with an increase of 23% relatively to the values obtained on similar specimens of polycarbonate alone. The elongation at break results to be decreased down to 1.5-2%.

We claim:

1. Process for preparing a thermotropic copolyester having a mesophase of nematic type, and temperatures of transition from the crystal phase to the mesophase of from about 140° C. up to about 320° C., comprising:

polymerizing in the molten phase at increasing temperatures of from about 190° C. up to about 320° C. for from 3 to 10 hours a mixture of the following monomers (a), (b), (c) and (d) in the presence of from 0.01 to 1 part by weight per each 100 parts by weight of the monomers of a catalyst selected from the group consisting of the carboxylates of sodium, potassium, calcium and magnesium, the oxides of these metals and oxides of titanium, antimony and tin, with removal of carboxy acid:

(a) a saturated α, ω-dicarboxy aliphatic acid:

$$HOOC-(CH_2)_n-COOH$$

wherein:
n is a number of from 3 to 8;
(b) 4,4'-di-acyloxy-diphenyl;
(c) p-acyloxybenzoic acid; and
(d) a substituted p-acyloxy-benzoic acid
wherein the substituted substituent is a halogen atom, or a linear or branched alkyl radical containing from 1 to 4 carbon atoms with the following mutual ratios of the monomers to one another:

$(a)/(b)=1;$ $[(c)+(d)]/(a)=1-7;$ $(d)/[(c)+(d)]=0.1-1.$

2. Process according to claim 1, wherein the 4,4'-diacyloxy-diphenyl is 4,4'-diacetoxy-diphenyl, the p-acyloxybenzoic acid is p-acetoxy-benzoic acid, and the substituted p-acyloxy-benzoic acid is a substituted p-acetoxy-benzoic acid, the catalyst is sodium acetate and polymerizing is in the molten phase at increasing temperatures of from about 190° C. up to about 280° C., for from 5 to 7 hours.

3. Process according to claim 2, wherein the 4,4'-diacetoxy-diphenyl, p-acetoxy-benzoic acid and substituted p-acetoxy-benzoic acid are formed prior to polymerizing by the reaction of acetic anhydride with 4,4'-dihydroxy-diphenyl, p-hydroxy-benzoic acid and substituted p-hydroxy-benzoic acid.

4. Process for preparing a thermotropic copolyester having a mesophase of nematic type, and temperatures of transition from the crystal phase to the mesophase of from about 140° C. up to about 320° C., comprising:

polymerizing in the molten phase at increasing temperatures of from about 190° C. up to about 320° C. for from 3 to 10 hours a mixture of the following monomers (a), (b), (c) and (d) in the presence of from 0.01 to 1 part by weight per each 100 parts by weight of the monomers of a catalyst selected from the group consisting of the carboxylates of sodium, potassium, calcium and magnesium, the oxides of these metals and oxides of titanium, antimony and tin, with removal of the carboxy acid, and annealing copolymer polymerization product at a temperature of from 130° C. to 210° C. for 1 to 20 hours at a reduced pressure:

(a) a saturated α, ω-dicarboxy aliphatic acid:

$$HOOC-(CH_2)_n-COOH$$

wherein:
n is a number of from 3 to 8;
(b) 4,4'-di-acyloxy-diphenyl;
(c) p-acyloxybenzoic acid; and
(d) substituted p-acyloxy-benzoic acid
wherein the substituted substituent is a halogen atom, or a linear or branched alkyl radical containing from 1 to 4 carbon atoms with the following mutual ratios of the monomers to one another:

$(a)/(b)=1;$ $[(c)+(d)]/(a)=1-7;$ $(d)/[(c)+(d)]=0.1-1.$

* * * * *